(12) United States Patent
Haussecker et al.

(10) Patent No.: US 6,879,121 B2
(45) Date of Patent: Apr. 12, 2005

(54) METHOD FOR CONTROLLING AN ELECTRIC DRIVING MOTOR OF AN ADJUSTING DEVICE PERTAINING TO A MOTOR VEHICLE

(75) Inventors: Walter Haussecker, Buehlertal (DE); Klaus Voehringer, Malsch (DE); Markus Kliffken, Buehl (DE); Stefan Kotthaus, Sinzheim (DE); Michael Soellner, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,555

(22) PCT Filed: Jan. 24, 2001

(86) PCT No.: PCT/DE01/00266
§ 371 (c)(1),
(2), (4) Date: Jan. 23, 2002

(87) PCT Pub. No.: WO01/61835
PCT Pub. Date: Aug. 23, 2001

(65) Prior Publication Data
US 2003/0173917 A1 Sep. 18, 2003

(30) Foreign Application Priority Data
Feb. 19, 2000 (DE) .......................................... 100 07 690

(51) Int. Cl.⁷ .................................................. H02P 3/00
(52) U.S. Cl. ........................ 318/280; 318/281; 318/283; 318/778
(58) Field of Search ................................ 318/280, 281, 318/283, 779, 276, 430, 431

(56) References Cited

U.S. PATENT DOCUMENTS

| | | | |
|---|---|---|---|
| 3,716,770 A | * 2/1973 | Habisohn | 318/259 |
| 3,895,275 A | * 7/1975 | Rostad | 318/798 |
| 4,114,076 A | * 9/1978 | Teranishi et al. | 388/849 |
| 4,482,853 A | * 11/1984 | Bhavsar | 318/778 |
| 4,544,870 A | * 10/1985 | Kearns et al. | 318/444 |
| 4,634,951 A | * 1/1987 | Kampf et al. | 318/778 |
| 4,658,191 A | * 4/1987 | Okita et al. | 388/812 |
| 4,831,312 A | 5/1989 | Okazaki et al. | 388/815 |
| 5,151,642 A | * 9/1992 | Lombardi et al. | 318/779 |
| 5,270,623 A | * 12/1993 | Ohta et al. | 318/268 |
| 5,747,956 A | 5/1998 | Lamm | 318/599 |
| 5,977,732 A | * 11/1999 | Matsumoto | 318/283 |
| 6,316,895 B1 | * 11/2001 | Ramarathnam | 318/439 |

FOREIGN PATENT DOCUMENTS

| | | | |
|---|---|---|---|
| DE | 108 868 | 10/1974 | |
| DE | 26 38 615 | 3/1978 | |
| DE | 35 16 985 A1 | 8/1986 | |
| DE | 35 14 223 A1 | 10/1986 | |
| DE | 3808966 | * 7/1988 | ............ H03G/3/20 |
| DE | 43 04 960 A1 | 8/1994 | |
| DE | 198 55 996 C1 | 12/1999 | |
| EP | 0 064 929 A | 11/1982 | |
| FR | 0 064 929 | * 5/1982 | ............ E05F/15/16 |

* cited by examiner

*Primary Examiner*—Rita Leykin
(74) *Attorney, Agent, or Firm*—Michael J. Striker

(57) ABSTRACT

A method for controlling an electric drive motor (10) of a motor vehicle adjusting drive by means of applying a variable voltage to it should be improved so that an EMV interference suppression can be inexpensively executed. To this end, a controllable resistor (12, 18, 20, 22) is used, which supplies the voltage applied to the drive motor (10).

23 Claims, 2 Drawing Sheets

METHOD FOR CONTROLLING AN ELECTRIC DRIVING MOTOR OF AN ADJUSTING DEVICE PERTAINING TO A MOTOR VEHICLE

PRIOR ART

The invention relates to a method for controlling an electric drive motor of a motor vehicle adjusting drive by means of applying a variable voltage to it.

A method of this kind has been disclosed in DE 43 04 960 A1. In the document cited, a pulse duration modulated control signal is used, which triggers a power output stage. In this manner, an output voltage is produced, which depends on the control signal and is applied to the drive motor. Because a low voltage is applied to the drive motor during starting, the drive motor starts gently so that the adjusting drive connected to it, for example a seat or window adjuster, is not subjected to any great mechanical stresses.

In this known method, it is disadvantageous that because of the pulse duration modulated signal, suppressing EMV interference involves considerable expense. If electrolytic capacitors are used for this, as is frequently the case, this takes up a comparatively large amount of space; furthermore, the temperature range in which this control can be exerted is limited.

The object of the invention is consequently to develop a method for controlling a drive motor that permits a gentle starting of the drive motor at a low cost, particularly with regard to the required interference suppression.

ADVANTAGES OF THE INVENTION

The method according to the invention, with the features of claim 1, offers the advantage that the interference produced by a pulse duration modulated control signal is prevented. There is also a reduction in current peaks during the starting of the drive motor. Consequently, no additional interference suppression components are required; the conventional interference suppression is sufficient, which can, for example, also remain local to the brush holder of the drive motor.

The preferred embodiment of the invention provides for starting the drive motor by applying a starting voltage that is lower than a nominal voltage applied during operation and for the voltage then being increased to the nominal voltage. A slow starting of the drive motor reduces both the mechanical stresses on the components of the adjusting drive as well as the noise produced during starting. This noise is produced in particular by the play present between all of the components involved in the transmission of force in the adjusting drive. If the nominal voltage were applied to the drive motor immediately, it would, due to existing play, start up at high speed until the play is eliminated in the drive direction. Because of the resistance suddenly increasing at this point, a "shock" occurs in the adjusting drive, which produces a large amount of noise. However, if a low voltage is applied to the drive motor first, the play present in the adjusting drive is eliminated in a comparatively gentle manner and the already-started drive motor is prevented from being abruptly braked by the resistance increase produced after the play is eliminated.

Preferably, the voltage applied to the drive motor increases from the starting voltage to the nominal voltage within a time interval of approximately 0.15 to 0.5 seconds. It has turned out that even this short time interval is sufficient to gently eliminate the play in the adjusting drive. If a longer time interval within which the voltage applied to the drive motor increases from the starting voltage to the nominal voltage were to be selected, this would yield virtually no further improvement in comfort while the power loss in the controllable resistor would increase sharply during this time interval. The time interval indicated therefore represents a good compromise between a high degree of comfort on the one hand and low power loss on the other.

The voltage applied to the drive motor can have different courses between the starting voltage and the nominal voltage. It is possible to increase the voltage in a linear fashion from the starting voltage to the nominal voltage, where an arbitrary value between 0 and a value of approximately 30% of the nominal voltage can be selected as the starting voltage. The higher the starting voltage selected, the lower the power loss that occurs up until the nominal voltage is reached. The lower the starting voltage selected, the less severe the "shock" that occurs during starting of the drive motor and less intense the resulting mechanical stresses and noise problems.

According to one embodiment of the invention, a voltage has already been applied to the drive motor it for a short period before it is actually started. This voltage, which can also be the nominal voltage, is applied for a short time interval specifically so that the drive motor can eliminate the play from the adjusting drive. Since the voltage is interrupted again promptly before the play is eliminated and the entire adjusting drive starts to run, essentially only the mass moment of inertia of the drive motor has to be braked when the resistance increase is reached. The "shock" produced here is comparatively slight. Then a voltage that increases from the starting voltage to the nominal voltage can again be applied to the drive motor so that it sets the adjusting drive in motion without jerking. Since the play has already been eliminated before this final starting, the increase from the starting voltage to the nominal voltage can take place in a correspondingly steep manner, which is advantageous in terms of the attendant power loss. If a voltage of zero is used as the starting voltage, if the increase to the nominal voltage occurs in a correspondingly steep fashion, and if in addition, before the actual starting, the nominal voltage has been applied to the drive motor for a short period, this type of operation can be compared in a purely conceptual manner to pulse duration modulation in which the nominal voltage is first applied to the drive motor for a short time in order to eliminate the play from the adjusting drive, then the voltage is switched off temporarily so that the drive motor with the adjusting drive comes to rest in a position in which the play has been eliminated, and then the nominal voltage is applied to the drive motor once more, so that the drive motor starts and sets the adjusting drive in motion.

According to one embodiment of the invention, before the starting of the drive motor, a check is made as to which rotating direction the drive motor was last operated in and the starting voltage is only applied to the drive motor if the drive motor is to be started in a direction opposite to the last rotation direction, whereas otherwise, the nominal voltage is applied immediately. This process is based on the knowledge that the play in the adjusting drive only exists if the drive motor is to be started in the rotation direction opposite from the last rotation direction. Consequently, only in this case is it necessary to gently start the drive motor whereas otherwise, the nominal voltage can be applied to the drive motor immediately. This embodiment of the method has the advantage that the power loss in the controllable resistor only occurs when the gentle starting of the drive motor is actually required. In a modification of the above-described method, the nominal voltage is only applied to the drive motor if a particular interval of time has elapsed since the last operation. This prevents the drive motor, when it is stopped, for example when a component moved by the adjusting drive is disposed in its end position, from being switched on a number of times in rapid succession, for example by playing children pressing repeatedly on the power window switch. If the drive motor were to be switched on with each actuation of the power window switch when the window is already closed, the blocking currents flowing as a result could cause impermissibly high thermal load on the drive motor.

According to another embodiment of the invention, before the drive motor is started, the temperature of a control unit for the drive motor is checked and the starting voltage is only applied to the drive motor if the attendant power loss will not result in any damage to the control unit, whereas otherwise the nominal voltage is applied immediately. This achieves a safety function, which applies the nominal voltage to the drive motor immediately whenever the power loss occurring in the controllable resistor during gentle starting of the drive motor would lead to impermissibly high temperatures. This prevents a high power loss from occurring in the controllable resistor. Consequently, the operational readiness of the adjusting drive is assured under all circumstances; but with critical temperature conditions, a reduction in comfort occurs, which is distinguished by increased production of noise during starting of the drive motor.

According to a variant of the invention, in order to stop the drive motor, a voltage is applied to it, which decreases in a controlled fashion from the nominal voltage down to zero. In this manner, different advantageous methods can be developed for stopping the drive motor when a component moved by the adjusting drive, for example an electrically adjustable seat, a power window, or a sliding sunroof reaches an end stop.

According to one embodiment, the position of a component driven by the drive motor is monitored and the drive motor is promptly switched off before the component reaches an end stop associated with it. This method, in which the absolute position of the component to be moved must be determined by means of a scaling process, prevents the noise produced when the component is pushed against an end stop by the drive motor. Another advantage is that the power loss does not demonstrate high peak values due to the blocking of the drive motor. If, in addition, the control circuit used does not have any mechanical relay, but is made up of exclusively electronic components, the switching off time can be very precisely determined and maintained since the travel time of mechanical parts does not have to be taken into consideration so that the reference position can be precisely maintained when switching off.

Alternatively, the torque produced by the drive motor can be monitored and the drive motor can be switched off when a particular torque has been exceeded, which is significant for the case in which a component driven by the drive motor has reached the stop associated with it. In this variant of the method, in the preliminary stages, a determination is made as to which course the resistance force being produced takes when the component driven by the adjusting drive strikes against the corresponding end stop. If the required force is being monitored at this point and the drive motor is switched off promptly, high blocking currents are prevented.

It is also possible in principle to use the method described here as a variant of the invention for stopping the drive motor, even independently of the use of the increasing voltage during the starting of the drive motor.

A transistor can be used as the controllable resistor, in particular a MOS field effect transistor or a bipolar transistor.

Advantageous embodiments of the invention ensue from the dependent claims.

DRAWINGS

The invention will be explained below with reference to different embodiments shown in the accompanying drawings.

FIGS. 1–1F show different courses of a voltage applied to the drive motor as well as the respectively resulting power loss;

Figure 1:
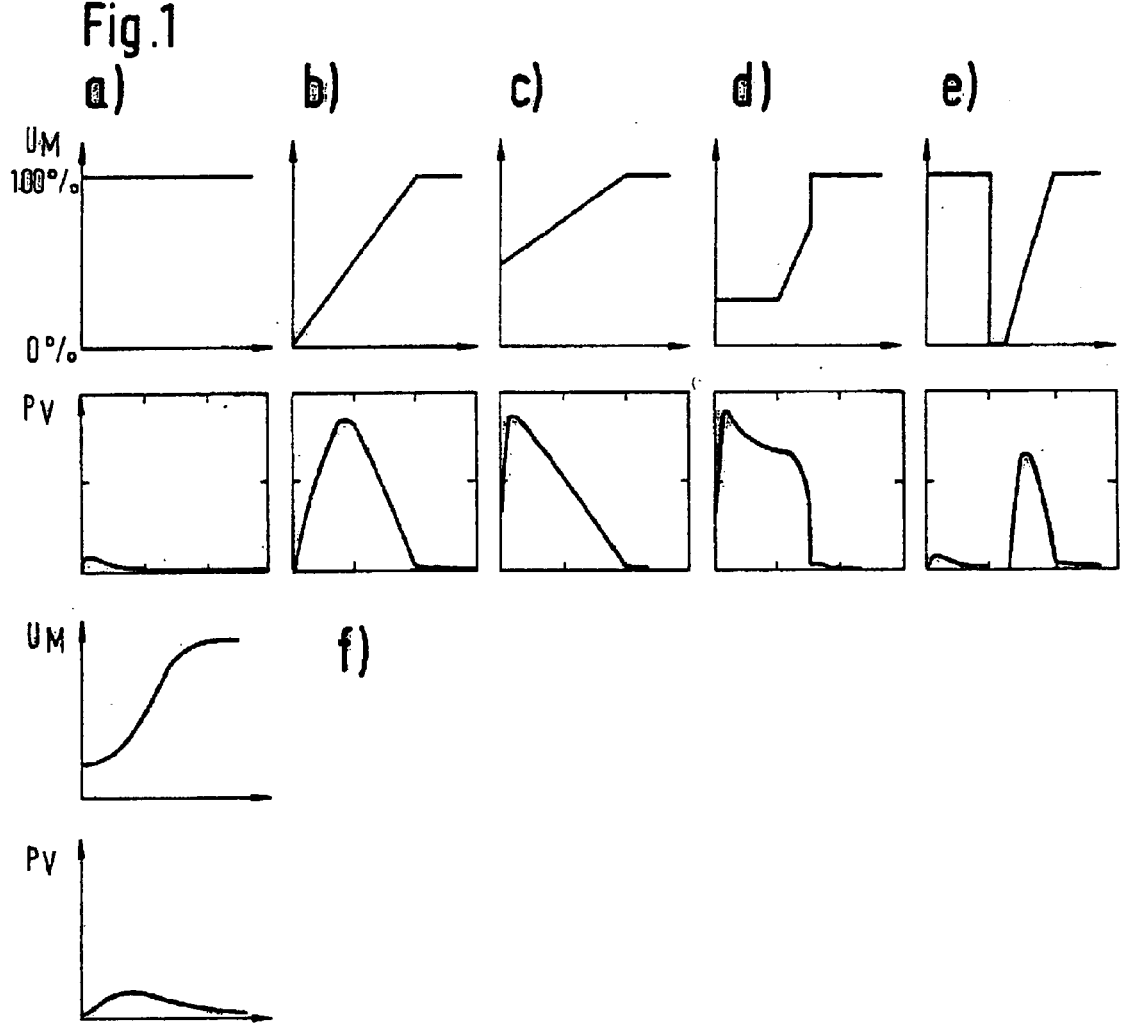

FIG. 1$a$ shows the course of a voltage $U_M$ applied to the drive motor as well as the power loss $P_V$ produced during the starting of the drive motor. In these graphs, a voltage of 100% of the nominal voltage is applied immediately to the drive motor for starting. There is in fact a very low power loss $P_V$, but there are also the undesirable side effects of a high production of noise and an intense mechanical stress of the components of an adjusting drive connected to the drive motor.

FIG. 1$b$ shows the course of the voltage as well as the power loss produced when the drive motor is controlled using a method according to the invention. The voltage applied to the motor is supplied via a controllable resistor so that in this embodiment, the voltage increases to the nominal voltage in a linear fashion, beginning from a starting voltage of zero. This results in a very gentle starting of the drive motor, with a correspondingly low production of noise and low mechanical stresses. As can be seen in the lower graph in FIG. 1$b$, however, a comparatively high power loss occurs in the controllable resistor.

FIG. 1$c$ shows a variant to the course that precedes it. In this case, the voltage applied to the drive motor is increased to the nominal voltage in a linear fashion, beginning from a starting voltage that is approximately 30% of the nominal voltage. In this course of the nominal voltage, a considerable power loss also occurs.

FIG. 1$d$ shows a modification in which the voltage applied to the drive motor, beginning from a starting voltage that is different from zero and is kept constant initially for a particular time interval, increases in a linear fashion to an intermediary voltage from which the voltage is abruptly increased to the nominal voltage. In this manner, first the drive motor is started with a reduced starting voltage; when the play in the adjusting drive has been eliminated and all mechanical parts are already in motion, the drive motor is initially supplied with the steeply increasing current and then is supplied abruptly with the nominal voltage.

FIG. 1$e$ shows the course of the starting voltage according to a method in which a comparatively low power loss occurs. At first, the nominal voltage is applied to the drive motor for a short time interval. This time interval is of such a size that the nominal voltage is switched off again before the drive motor has eliminated the play in the adjusting drive. Because of its inertia of masses, the armature of the drive motor rotates further even after the nominal current is switched off until, when the play in the adjusting drive has been eliminated, the armature is braked by the then increasing resistance in the adjusting drive. The drive motor, for example if it is still being acted on by the nominal voltage, is thus prevented from rotating against the still stationary parts of the adjusting drive after the play has been eliminated. Then, a voltage can be applied to the drive motor, which, beginning from a starting voltage of zero, increases comparatively steeply until reaching the nominal voltage. On the whole, this produces a low power loss.

FIG. 1f shows an S-shaped course of the starting voltage. In this case, a low production of noise occurs along with a likewise low power loss, but entails a high cost for technical switching reasons.

It should be noted that the graphs shown are given by way of example. Other courses are also possible. Thus a curve could be selected which represents a compromise among complexity of the control circuit, noise production, and power loss.

Figure 2:
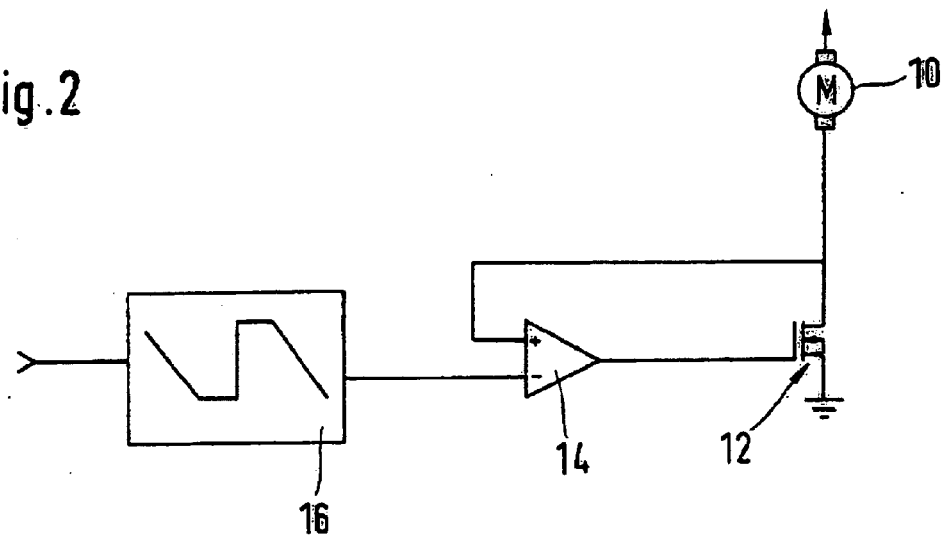
FIG. 2 shows a block circuit diagram of a circuit for controlling a drive motor.

FIG. 2 shows a block circuit diagram of a circuit for controlling an electric drive motor 10. A transistor 12, which is triggered by a regulating circuit 14, is used as the controllable resistor. If a MOS field effect transistor is used as the transistor 12, the regulating circuit, which can for example be a simple amplifier circuit with an operational amplifier, is connected to the gate and if a bipolar transistor is used, the regulating circuit is connected to the base. The regulating circuit assures that the voltage applied to the drive motor 10 increases in a linear fashion during the starting of the motor. To this end, a control signal is used, which is supplied by a control circuit 16 and whose course is shown in FIG. 3.

In the rest position, no voltage is applied to the drive motor 10 since the control circuit 16 supplies a voltage that switches off the transistor via the regulating circuit 14. The voltage at the collector of the transistor is correspondingly set to the supply potential. If the motor is switched on at time t1, the control circuit 16 reduces the control voltage in a linear fashion, as shown in FIG. 3. This can take place through the charging or discharging of a capacitor. The regulating circuit 14 then controls the transistor so that its collector voltage follows this course. Consequently, the voltage applied to the drive motor 10 increases. At time t2, the control voltage is 0 volts, which means that the transistor is completely conductive. As a result, the nominal voltage is present at the drive motor.

The drive motor starts gently by means of the voltage applied to the drive motor, which voltage increases during the time interval between t1 and t2. Furthermore, the switch-on current is sharply reduced so that the interferences produced by it are likewise reduced.

Figure 3:
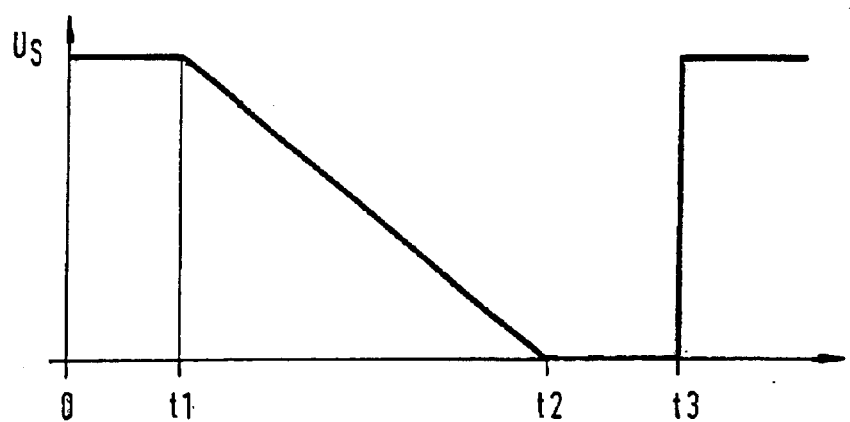
FIG. 3 shows a graph of the course of a control voltage in the circuit from FIG. 2.

The graph in FIG. 3 also shows the control voltage for a switching off of the drive motor at time t3. If it is desirable at this point for the drive motor to be brought to a stop slowly, a linear change of the signal can also be used at this point, i.e. a linear increase at this point from 0 volts.

If the adjusting drive connected to the drive motor 10 is a power windows system for a motor vehicle, for example, the time interval between points T1 and T2 is on an order of magnitude of 0.15 to 0.5 seconds. This already results in a considerable reduction of noise when the window starts to move, whereas longer times do not yield any perceptible improvement and only result in unnecessary power losses in the transistor.

Figure 4:
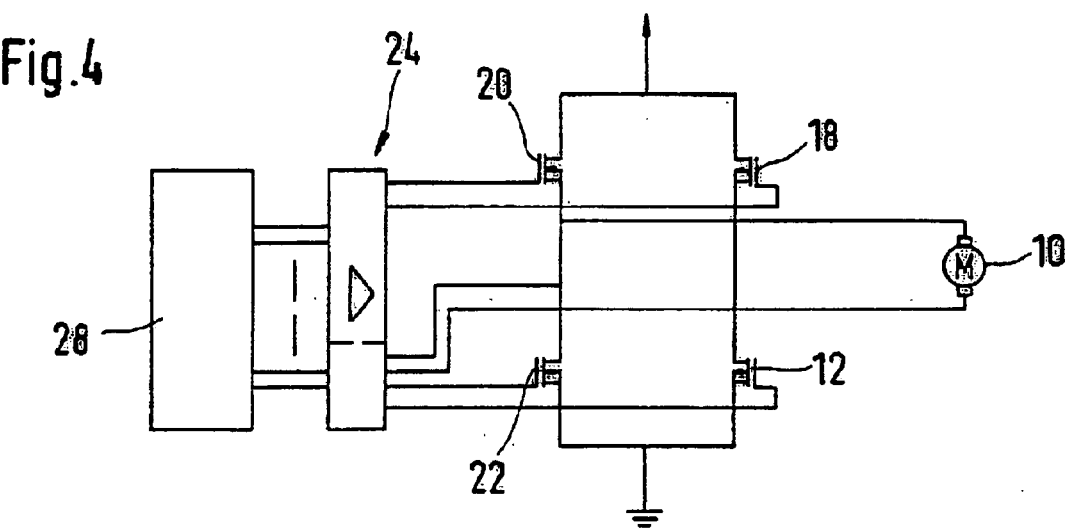
FIG. 4 shows a block circuit diagram of another circuit for motor control.

FIG. 4 shows a block circuit diagram of an alternative motor control unit. In this case, four transistors 12, 18, 20, 21 are used, which are connected in an H-shaped bridge configuration so that the drive motor 10 can be driven in both rotation directions. The corresponding control signals originate from a drive circuit 24.

Figure 5:
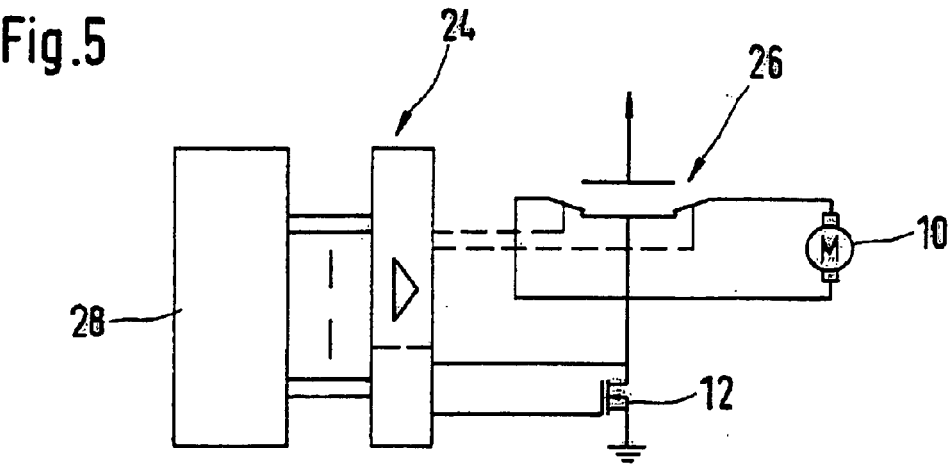
FIG. 5 is a block circuit diagram of yet another circuit for motor control.

FIG. 5 shows another embodiment of a control circuit. In this embodiment, a relay 26 is used as a bridge; the rotation direction of the drive motor 10 is thus set by means of the relay contacts. The voltage applied to the drive motor 10 is controlled by means of the transistor 12.

The control circuits shown in FIGS. 4 and 5 each have a numerical control unit 28 that can perform various additional functions, for example an overload protection.

If the adjusting drive connected to the drive motor is already disposed in an end position, i.e. the entire system is blocked, a repeated switching-on of the drive motor would result in considerable power losses. In order to prevent excessively high thermal loads from occurring with a repeated switching-on of the drive motor in this state, which could result in destruction of the control circuit, the numerical control unit 28 can prevent the drive motor from being triggered repeatedly in the same direction with the linear increase in the supply voltage. It is possible for a triggering in the same direction to be permitted only if a particular interval of time has elapsed since the last triggering. It is also possible to carry out a temperature monitoring which only permits a triggering with increasing supply voltage, i.e. high attendant power loss, if this will not result in overheating; otherwise, a triggering can be carried out with the nominal voltage immediately so that the attendant losses are correspondingly low.

It is also possible to execute the triggering with the linearly increasing supply voltage only if the motor is to be driven in a rotation direction opposite from the last rotation direction. This is based on the knowledge that the play in the adjusting drive only has to be eliminated through a gentle starting of the drive motor when a rotation direction reversal occurs. When the drive motor is started again in the same direction as the preceding operation, the play has already been eliminated by the preceding operating cycle.

| Reference Numeral List | |
|---|---|
| 10: | motor |
| 12: | transistor |
| 14: | regulating circuit |
| 16: | control circuit |
| 18: | transistor |
| 20: | transistor |
| 22: | transistor |
| 24: | drive circuit |
| 26: | relay |
| 28: | numerical control unit |

What is claimed is:

1. A method for controlling an electric drive motor (10) of a motor vehicle adjusting drive by means of applying a variable voltage to the drive motor, characterized in that a controllable resistor (12, 18, 20, 22) is used, wherein said controllable resistor supplies the voltage applied to the drive motor, wherein in order to start the drive motor (10), a starting voltage is initially applied to the drive motor, wherein said starting voltage is lower than a nominal voltage applied during operation, and the voltage is then increased to the nominal voltage, and wherein an MOS field effect transistor is used as the controllable resistor and is triggered by a regulating circuit (14) connected to a gate of the MOS field effect transistor, and wherein said regulating circuit (14) is an amplifier circuit including an operational amplifier.

2. A method for controlling an electric drive motor (10) of a motor vehicle adjusting drive by means of applying a variable voltage to the drive motor, characterized in that a controllable resistor (12, 18, 20, 22) is used, wherein said controllable resistor supplies the voltage applied to the drive motor, wherein in order to start the drive motor (10), a starting voltage is initially applied to the drive motor, wherein said starting voltage is lower than a nominal voltage applied during operation, wherein the voltage is then increased to the nominal voltage, wherein the voltage is increased from the starting voltage to the nominal voltage within a time interval of approximately 0.15 to 0.5 seconds;
wherein prior to applying the starting voltage to the drive motor, a temperature of a control unit for the drive motor is checked and the starting voltage is applied to the drive motor, only if an attendant power loss will not result in damage to the drive motor, and whereas otherwise the nominal voltage is immediately applied to the drive motor.

3. A method for controlling an electric drive motor (10) of a motor vehicle adjusting drive by means of applying a variable voltage to the drive motor, characterized in that a controllable resistor (12, 18, 20, 22) is used, wherein said controllable resistor supplies the voltage applied to the drive motor, wherein the voltage is initially kept constant at a value of a starting voltage for a short first time interval, and then is steadily increased to an intermediary voltage within a second time interval, and finally is increased abruptly from the intermediary voltage to a nominal voltage;
wherein prior to applying the starting voltage to the drive motor, a temperature of a control unit for the drive motor is checked and the starting voltage is applied to the drive motor, only if an attendant power loss will not result in damage to the drive motor, and whereas otherwise the nominal voltage is immediately applied to the drive motor.

4. A method for controlling an electric drive motor (10) of a motor vehicle adjusting drive by means of applying a variable voltage to the drive motor, characterized in that a controllable resistor (12, 18, 20, 22) is used, wherein said controllable resistor supplies the voltage applied to the drive motor, and wherein a starting voltage applied to the drive motor has an S-shaped course.

5. The method as defined in claim 1, characterized in that the voltage is increased from the starting voltage to the nominal voltage within a time interval of approximately 0.15 to 0.5 seconds.

6. The method as defined in claim 1, characterized in that the starting voltage is 30 percent of the nominal voltage.

7. The method as defined in claim 1, characterized in that the starting voltage is a constant voltage, after a first time interval the voltage is increased steadily from the starting voltage to an intermediary voltage, and after a second time interval following the first time interval the voltage is increased abruptly to the nominal voltage.

8. The method as defined in claim 1, characterized in that, prior to applying the starting voltage to the drive motor, a check is performed to determine in which rotation direction the drive motor was last operated and the starting voltage is applied to the drive motor, only if the drive motor is to be driven in a direction opposite from the last rotation direction, and whereas otherwise the nominal voltage is immediately applied to the drive motor.

9. The method as defined in claim 1, characterized in that, prior to applying the starting voltage to the drive motor, a temperature of a control unit for the drive motor is checked and the starting voltage is applied to the drive motor, only if an attendant power loss will not result in damage to the drive motor, and whereas otherwise the nominal voltage is immediately applied to the drive motor.

10. The method as defined in claim 1, characterized in that a torque produced by the drive motor is monitored and the drive motor is switched off when a particular value of the torque is exceeded and said particular value of said torque is selected to indicate that a component driven by the drive motor has reached an end stop associated therewith.

11. The method as defined in claim 2, characterized in that the starting voltage is 30 percent of the nominal voltage.

12. The method as defined in claim 2, characterized in that the starting voltage is a constant voltage, after a first time interval the voltage is increased steadily from the starting voltage to an intermediary voltage, and after a second time interval following the first time interval the voltage is increased abruptly to the nominal voltage.

13. The method as defined in claim 2, characterized in that, prior to applying the starting voltage to the drive motor, a check is performed to determine in which rotation direction the drive motor was last operated and the starting voltage is applied to the drive motor, only if the drive motor is to be driven in a direction opposite from the last rotation direction, and whereas otherwise the nominal voltage is immediately applied to the drive motor.

14. The method as defined in claim 2, characterized in that a torque produced by the drive motor is monitored and the drive motor is switched off when a particular value of the torque is exceeded and said particular value of said torque is selected to indicate that a component driven by the drive motor has reached an end stop associated therewith.

15. The method as defined in claim 2, characterized in that a MOS field effect transistor or a bipolar transistor is used as the controllable resistor.

16. The method as defined in claim 3, characterized in that the starting voltage is 30 percent of the nominal voltage for operation of the drive motor and the voltage is increased from the starting voltage to the nominal voltage within a time interval of approximately 0.15 to 0.5 seconds.

17. The method as defined in claim 3, characterized in that, prior to applying the starting voltage to the drive motor, a check is performed to determine in which rotation direction the drive motor was last operated and the starting voltage is applied to the drive motor, only if the drive motor is to be driven in a direction opposite from the last rotation direction, and whereas otherwise the nominal voltage is immediately applied to the drive motor.

18. The method as defined in claim 3, characterized in that a torque produced by the drive motor is monitored and the drive motor is switched off when a particular value of the torque is exceeded and said particular value of said torque is selected to indicate that a component driven by the drive motor has reached an end stop associated therewith.

19. The method as defined in claim 3, characterized in that a MOS field effect transistor or a bipolar transistor is used as the controllable resistor.

20. The method as defined in claim 4, characterized in that, prior to applying the starting voltage to the drive motor, a check is performed to determine in which rotation direction the drive motor was last operated and the starting voltage is applied to the drive motor, only if the drive motor is to be driven in a direction opposite from the last rotation direction, and whereas otherwise the nominal voltage is immediately applied to the drive motor.

21. The method as defined in claim 4, characterized in that, prior to applying the starting voltage to the drive motor, a temperature of a control unit for the drive motor is checked and the starting voltage is applied to the drive motor, only if an attendant power loss will not result in damage to the drive motor, and whereas otherwise the nominal voltage is immediately applied to the drive motor.

22. The method as defined in claim 4, characterized in that a torque produced by the drive motor is monitored and the drive motor is switched off when a particular value of the torque is exceeded and said particular value of said torque is selected to indicate that a component driven by the drive motor has reached an end stop associated therewith.

23. The method as defined in claim 4, characterized in that a MOS field effect transistor or a bipolar transistor is used as the controllable resistor.

* * * * *